United States Patent [19] [11] Patent Number: 4,581,299
Jäger [45] Date of Patent: Apr. 8, 1986

[54] BLANK FOR THE MANUFACTURE OF SPHERICAL FILLING BODIES

[76] Inventor: Rolf A. Jäger, 2048 Phalorope Ct., Costa Mesa, Calif. 92626

[21] Appl. No.: 570,771

[22] Filed: Jan. 16, 1984

[51] Int. Cl.⁴ .............................................. B01D 53/20
[52] U.S. Cl. ........................ 428/542.8; 261/DIG. 72; 273/58 D; 428/11
[58] Field of Search ................ 428/11, 12, 122, 542.8, 428/134, 136; 273/58 D; 261/DIG. 72; 72/379

[56] References Cited

U.S. PATENT DOCUMENTS

| | | | |
|---|---|---|---|
| 2,159,355 | 5/1939 | Goetze | 428/122 |
| 2,475,332 | 7/1949 | Merrill | 428/122 |
| 2,728,982 | 1/1956 | Merrill | 72/379 X |
| 2,791,868 | 5/1957 | Viken | 428/11 X |
| 2,979,812 | 4/1961 | Russell | 72/379 X |
| 2,990,640 | 7/1961 | Burnbaum | 428/11 X |
| 3,633,538 | 1/1972 | Hoeflin | 428/11 X |
| 3,709,767 | 1/1973 | Saiga | 428/11 X |
| 3,987,580 | 10/1976 | Ausnit | 428/542.8 X |
| 4,006,908 | 2/1977 | Minami | 273/58 D X |
| 4,093,761 | 6/1978 | Taylor | 428/122 X |
| 4,203,935 | 5/1980 | Hackenjos | 261/98 |
| 4,333,892 | 6/1982 | Ellis et al. | 261/DIG. 72 |

FOREIGN PATENT DOCUMENTS 3244921 6/1984 Fed. Rep. of Germany ... 261/DIG. 72

Primary Examiner—Henry F. Epstein
Attorney, Agent, or Firm—Knobbe, Martens, Olson & Bear

[57] ABSTRACT

A blank for forming a spherical filling body for material-exchange columns is formed by stamping from a strip sheet of metal series of tongue-like elements extending from a middle strip. The spherical body can be formed by bending the tongue-like elements into a curved form, then bending the middle strip to form a ring. The tongue-like elements provide a plurality of drip edges to facilitate the interaction of the liquid and the gas in the material exchange column. Additional elements can be formed with the tongue-like elements to provide additional drip edges when the filling body is assembled.

11 Claims, 5 Drawing Figures

U.S. Patent  Apr. 8, 1986  4,581,299
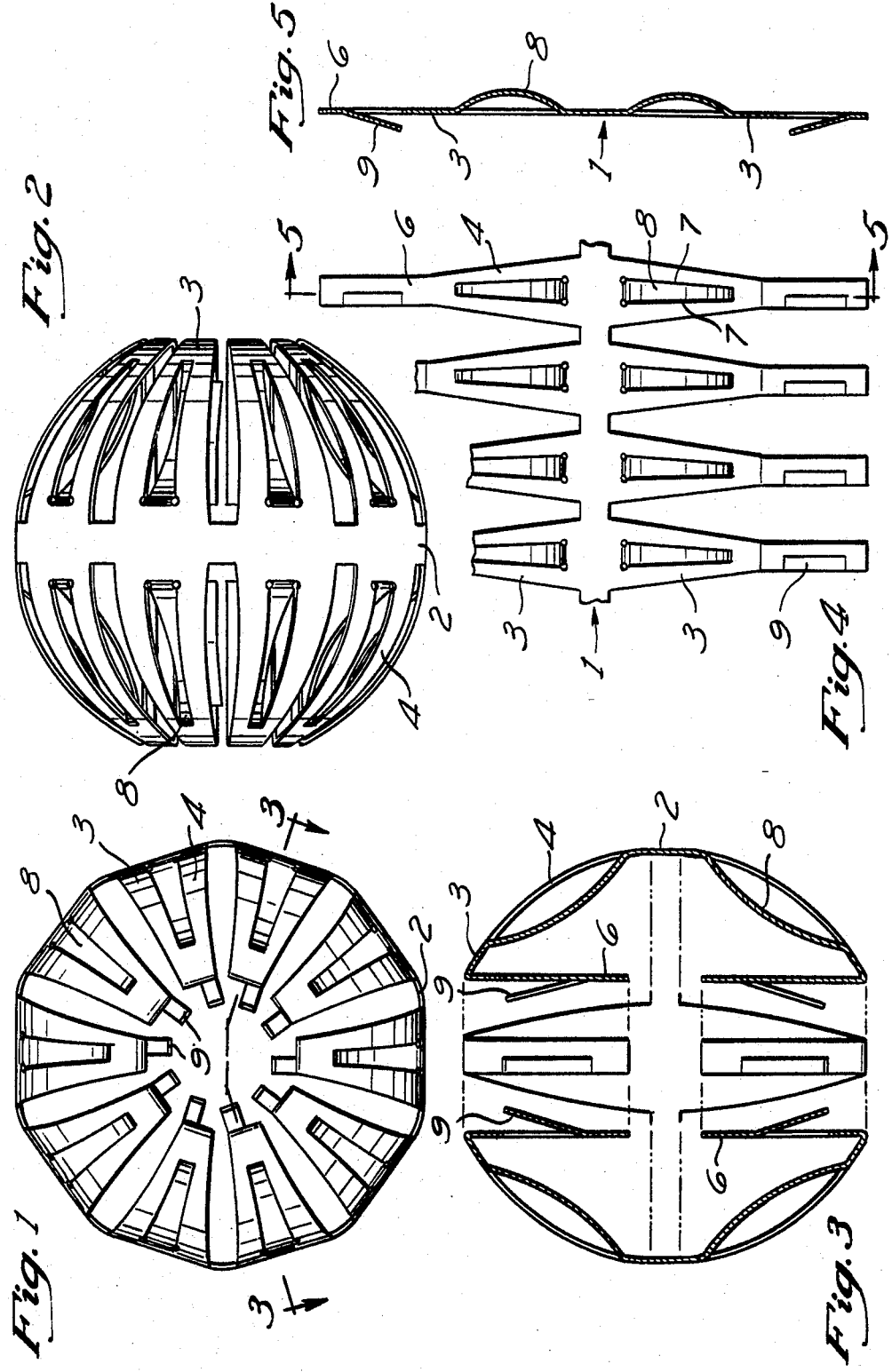

BLANK FOR THE MANUFACTURE OF SPHERICAL FILLING BODIES

BACKGROUND OF THE INVENTION

The invention relates to a plate-shaped metallic blank for the manufacturing of spherical filling bodies for material exchange columns.

Spherical, hollow filling bodies for material exchange columns, heat exchange columns, washing towers for gases and the like are known. Such filling bodies are introduced in form of bulk- or fill-material into the material exchange columns, heat exchange columns, wash towers for gases, etc. The stream of liquid—which is conveyed through the loose- or bulk-material in downward direction—and/or the stream of gas—which is conveyed in upward direction through the loose- or bulk-material are to be distributed as finely as possible within the loose- or bulk-material through the intervention of the filling bodies, so that the liquid and the gas can come in as close contact as possible with one another, or so that liquid and/or solid impurities can be separated from the gases as readily as possible.

In general, such filling bodies consist of a latticework body made of a synthetic material or plastic, which filling body has an equatorial ring, from which ring meridian-shaped strips extend toward the poles. The meridian-shaped strips end a short distance from the poles. In its interior, such a filling body also displays cross-pieces and the like, to increase the surface and the number of edges and corners from which the liquid can drip off and can impinge against the gases. Such type of bodies molded from plastics can be manufactured without difficulties by using, for example, injection molding processes. The manufacturing of these filling bodies from metal has been possible only by a casting process, or a similar process involving great expenditures of energy and time.

SUMMARY OF THE INVENTION

It is the task of the present invention to create a possibility for the manufacturing of spherical filling bodies for material exchange columns or the like, by using plate-like metallic blanks, which can be punched out in a simple manner from thin pieces of sheet metal or the like. In one embodiment a blank consisting of a middle strip which on both sides displays outwardly directed tongue-like elements is formed. In another embodiment, a blank of the cited type consists of two side strips interconnected by means of cross pieces.

Such a blank can be produced from a rectangular piece of metal displaying several stamped-out sections which are arranged in perpendicular direction to the longitudinal axis of said metal piece and terminate at a small distance from the side strips, or can be produced from a rectangular piece of metal displaying several stamped-out sections which are arranged in perpendicular direction to the longitudinal axis of the metal piece and extend from the side of the middle strip.

The spherical filling body made up of such blanks is manufactured in the following manner. The cross-pieces, which lie between the side strips and are adjacent to the stamped-out sections are bent outwardly from the flat surface of the metal piece in opposite directions, or in that at both sides of the middle strip, tongue-like elements are bent in the same direction at an angle of approximately 90°, and in that the free extremities of the side strips or of the middle strip are subsequently folded together.

If the blank has a middle strip, the latter forms the equatorial region of the spherical filling body. From this middle strip, the tongue-like elements are then directed in meridian-like manner toward the poles.

When dealing with the case of a blank having a middle strip and outwardly directed tongue-like elements, the latter are to be arranged at a distance from one another, so that these tongue-like elements can also be bent in a meridian-like manner toward the poles, without touching one another. At the middle strip, the width of the tongue-like element is to be greater than that of the distance between two adjacent tongue-like elements. Also, the tongue-like elements on both sides of the middle strip should be staggered with respect to one another. In the direction away from the middle strip, the width of the tongue-like element should decrease. At the free extremities, the tongue-like elements can bear flap-like elements which, expediently, are everywhere of equal width. During the bending process of the blank, these flap-like elements at the free extremities of the tongue-like elements, are bent over in an approximately quadrantal manner, so that their surface lies substantially parallel the surface of the middle strip. In the spherical body, after the bending processes have been completed, the free ends of these tongue-like elements thus extend approximately perpendicularly to a flat surface determined by the middle strip. For a further increase of the free edges, the tongue-like elements can display stamped-out sections which lie in perpendicular direction to the longitudinal axis of the middle strip, whereby the sections lying between the stamped-out sections are curved in opposite sense to the tongue-like elements.

For a still further increase of the free corners and edges, the flap-like elements can display additional stamped-out sections at the free extremities of the tongue-like elements, which stamped-out sections form projecting elements. The latter are then bent. The projecting elements should be connected thereby at the free extremity of the flap-like elements to the same. The blank is to be folded together in such a manner so that the flap-like elements lie on the inside of the free extremities of the tongue-like elements and that the free extremities of the flap-like elements lie at a small distance from the middle strip.

If the blank has two side strips, then the spherical filling body displays two short, tubular connecting pieces at two opposite lying sides. Between the connecting pieces, the cross-pieces, which are curved or bulge in opposite directions are located, which cross-pieces are partially curved outwardly in a convex manner, or partially inwardly in a concave manner. The outwardly curved cross-pieces form the spherical shell, whereas the inwardly curved cross-pieces represent additional dripping edges and impact edges for the liquid or the gases.

BRIEF DESCRIPTION OF THE DRAWINGS

Further characteristics of the invention are given in the description of the figures. In FIGS. 1 to 5, the invention is illustrated by means of an exemplified embodiment, without limiting itself to this exemplified embodiment.

FIG. 1 shows a filling body, bent in a finished manner from a blank according to FIG. 4, seen in direction toward one pole;

FIG. 2 is a side view of a filling body designed according to FIG. 1; and

FIG. 3 is a cross-section along line 3—3 in FIG. 1.

FIG. 4 shows a top view of a blank displaying a middle strip;

FIG. 5 shows a cross-section along line 5—5 in FIG. 4.

DETAILED DESCRIPTION

The blank designed according to FIGS. 1 and 2, is expediently produced from a strip-shaped piece, the width of which should approximately correspond to the height of the filling body to be manufactured. The strip-shaped piece consists of a piece of sheet metal of a desired thickness, for example 0.5 mm. The metal is selected thereby while keeping the purpose of utilization in mind.

The blank, which is then likewise a plate-shaped piece of metal, displays a middle strip 1 which, on both sides, has a plurality of outwardly directed tongue-like elements 3, as shown in FIG. 4. For the manufacturing of the filling body of the type illustrated in FIGS. 1 to 3, these tongue-like elements 3 are bent in the same direction in a quadrantal manner so the ends of the tongue-like elements 3 are directed at approximately 90° to the surface of the middle strip 1. The free extremities of the middle strip 1 are then folded together in such a manner so that the free extremities of the tongue-like elements 3 are directed toward one another. Thus, in the finished filling body, the middle strip 1 forms the equatorial region, while the tongue-like elements 3 are directed toward the poles in a meridian-like manner.

At their free extremities, each of the tongue-like elements 3 display a flap-like element 6, all of which are bent over at approximately 90° to the free ends of the tongue-like elements 3 from which they extend. In the case of the finished filling body, the flap-like elements 6 are thus directed inwardly and are approximately perpendicular to a plane imagined to be located on the equator formed by the middle strip 1 (see FIG. 3). It has been found advantageous that the flap-like elements 6 be of a length such that, after bending the blank into the spherical filling body, the free ends of the flap-like elements 6 extend to a small distance from the plane defined by a meridian middle strip 2, as shown in FIG. 3.

A plurality of stamped-out sections 7 can also be provided in the tongue-like elements 3 to provide additional drip edges. These stamped-out sections 7 are perpendicular to the longitudinal axis of the blank, and hence perpendicular to the middle strip 1. A surface section 8, which lies between these stamped-out sections 7, is then bent inwardly, opposite to the curve of the tongue-like elements 3.

The flap-like elements 6 at the free extremities of the tongue-like elements 3, can also display stamped-out sections, through the bending of which, a plurality of projecting elements 9 are formed. These projecting elements can be expediently connected with the flap-like elements 6, namely at the free extremity of the latter. The free edge or extremity of the projecting elements 9 is bent into the area which, in the case of the finished filling body, lies between the flap-like elements 6, as shown in FIG. 3.

The tongue-like elements 3—which, in the finished filling body, are arranged in meridian-like form—are exclusively connected with one another via the middle strip 1. Nevertheless, a relatively pressure resistant and mechanical-stress resistant structure is obtained. Within the polar region the free ends of the tongue-like elements 3 touch one another in an elastically yielding manner and support one another. Through the flap-like elements 6 and the projecting elements 9, a large number of free edges and corners are present within the filling body, from which edges and corners the liquid can drip off for maximum interaction with the gases flowing through the column.

It is advantageous to construct the blank so that the width of the tongue-like elements 3 is greater than the distance between adjacent tongue-like elements 3. This permits room for the stamped-out sections 7 and the surface section 8 between the stamped-out sections 7 so that the additional drip edges can be formed.

As a result, the width of the tongue-like elements 3 should decrease in a direction away from the middle strip 1. Since the tongue-like elements 3 are to be bent in a meridian-like manner to form the spherical filling body, the taper of the tongue-like elements is advantageously sufficient that the free ends of the tongue-like elements 3 do not overlap when the blank is bent into a spherical shape, but the ends do may on occasion thereafter touch from time to time to provide strength for the finished body.

Some may find it desirable to stagger the tongue-like elements on opposite sides of the middle strip 1, so that the elements 3 on opposite sides of the middle strip 1 are not directly opposite one another. Such staggering of the elements 3 may help break the flow of drops of liquid from one hemisphere to the other, thereby increasing the fluid interaction.

I claim:

1. A plate-shaped blank for the manufacture of a spherical filling body for material exchange columns comprising:

a middle strip; and a plurality of tongue-like elements extending from the sides of the middle strip, each curved in substantially the same direction and each taper from the end adjoining the middle strip to the free end, the width of the tongue-like element at the middle strip greater than the distance between two adjacent tongue-like elements, said tongue-like elements additionally include stamped-out sections along the length thereof to define a surface section, said surface section bent in a direction opposite the curve of the tongue-like elements, and flap-like elements extending from the ends of the tongue-like elements, the flap-like elements shorter than the tongue-like elements from which they extend.

2. A blank as defined in claim 1, wherein the tongue-like elements which are curved or bulge in opposite directions have two side strips.

3. A plate-shaped blank for the manufacture of a shperical filling body for material exchange columns, comprising:

a middle strip; and a plurality of tongue-like elements extending from the sides of the middle strip, each tongue-like element having an end adjoining the middle strip and a free end, the width of the tongue-like elements at a point remote from the middle strip less than the width of the tongue-like elements at the point at which they join the middle strip, said tongue-like elements additionally include stamped-out sections along the length thereof to define a surface section that can be bent separately from the remainder of the tongue-like element.

4. A substantially spherical metal filling body for exchange columns comprising:

an equatorial ring;

a plurality of tongue-like elements having free ends, and extending in opposite directions from the equatorial ring, wherein the tongue-like elements are curved so that the free ends of the tongue-like elements extending in one direction from the equatorial ring are relatively near one another to form a first polar region, and the free ends of the tongue-like elements extending in the other direction from the equatorial ring are relatively near one another to form a second polar region.

5. A filling body as defined in claim 4, wherein at least some of the tongue-like elements have elongate stamped out sections that are curved opposite the curve of the tongue-like elements.

6. A filling body as defined in claim 4, additionally comprising a plurality of flap-like elements, each extending from the free end of one of the tongue-like elements into the interior of the sphere.

7. A filing body as defined in claim 6, wherein the flap-like elements extend substantially perpendicular to the plane defined by the equatorial ring.

8. A filling body as defined in claim 6, wherein at least some of the flap-like elements have stamped out sections forming projecting elements.

9. A filling body as defined in claim 6, wherein at least some of the tongue-like elements have elongate stamped out sections that are curved opposite the curve of the tongue-like elements.

10. A substantially spherical metal filling body for exchange columns comprising:

an equatorial ring;

a plurality of curved tongue-like elements extending in a meridian-like manner from either side of the equatorial ring, wherein:

the free ends of the tongue-like elements form two polar regions; and at least some of the tongue-like elements each include an elongate stamped out section curved opposite the curve of the tongue-like element; and a plurality of flap-like elements, each extending from the free end of one of the tongue-like elements into the interior of the sphere.

11. A filling body as defined in claim 10 wherein at least some of the flap-like elements have stamped out sections forming projecting elements.

* * * * *